United States Patent [19]

Uejio

[11] Patent Number: 5,015,859
[45] Date of Patent: May 14, 1991

[54] METHOD AND APPARATUS FOR DETECTING WEAR

[75] Inventor: Wayne H. Uejio, Schenectady, N.Y.

[73] Assignee: General Electric Company, Schenectady, N.Y.

[21] Appl. No.: 412,034

[22] Filed: Sep. 25, 1989

[51] Int. Cl.$^5$ ............................................ G01M 11/08
[52] U.S. Cl. .............................. 250/358.1; 250/227.14
[58] Field of Search ............ 250/358.1, 338.1, 227.11, 250/227.15

[56] References Cited

U.S. PATENT DOCUMENTS

| | | | |
|---|---|---|---|
| 4,229,613 | 10/1980 | Braun | 174/47 |
| 4,449,098 | 5/1984 | Nakamura et al. | 324/326 |
| 4,554,650 | 11/1985 | Brown et al. | 367/154 |
| 4,735,083 | 4/1988 | Tenenbaum | 73/40.5 |
| 4,884,434 | 12/1989 | Satake et al. | 250/227.14 |

FOREIGN PATENT DOCUMENTS 0008524 1/1981 Japan ............................ 250/227.11

Primary Examiner—Jack I. Berman
Assistant Examiner—Richard Hanig
Attorney, Agent, or Firm—Paul R. Webb, II; James C. Davis, Jr.

[57] ABSTRACT

A method and apparatus for detecting wear of an article is described. In one embodiment, an optical fiber is wrapped helically around and between inner and outer surfaces of the article, such as a conduit. Increased transmission losses through the fiber are detected to indicate exposure and/or wear of the fiber, thereby indicating wear of the article.

17 Claims, 4 Drawing Sheets

METHOD AND APPARATUS FOR DETECTING WEAR

The present invention relates to detection of wear, and more specifically, relates to utilization of an optical fiber for detecting wear of articles such as pipes and wires.

BACKGROUND OF THE INVENTION

Detecting wear of electrical conductors such as insulated wires and conduits such as plastic pipes and hoses is important early detection of wear can lead to prevention of a system failure. For example, a conduit such as a plastic pipe for carrying a liquid such as water includes an outer surface, an inner surface and a wall having a thickness defined by the inner and outer surfaces. The inner surface also defines a fluid flow path. When the conduit is placed within the ground, usually three to four feet below the surface of the earth, the outer surface of the plastic pipe is exposed to the earth and will wear due to natural forces occurring within the earth. Wear also occurs along the inner surface of the pipe due to the flow of water within the pipe. As the outer and inner surfaces of the plastic pipe wear, the wall defined by the outer and inner surfaces decreases in thickness and eventually may wear completely through. If this occurs, the water flowing through the pipe will escape into the earth and a costly repair process must be performed in order to restore operation.

In order to minimize the possibility of complete failure of a system, plastic pipe and the like usually are replaced in accordance with a predetermined time schedule. More specifically, the pipe is replaced, for example, when 60% of its calculated useful life has expired. Therefore, plastic pipe and the like, which may have an actual remaining useful life of many years, generally will be replaced regardless of its condition. Replacement processes thus generally are more qualitative, e.g. the pipe is old, rather than quantitative, e.g. the pipe has worn to a certain point. This replacement process leads to waste, for example, because conduits may be replaced even though only a small percentage of their actual useful life has expired.

The above example with regard to plastic pipe used to carry water is for illustrative purpose only. For example, such wear occurs in steel pipes and other conduits. Electrical conductors such as insulated wire also undergo wear. Specifically, the insulation surrounding the conductive wire eventually may wear through. Wear detection therefore is useful in many fields and is not limited to any particular field.

Further, wear detection is a time-consuming task. For example, the task of inspecting wires for wear in a single airplane is very time-consuming, sometimes requiring miles of wire to be inspected by hand. Also, inspecting plastic pipe for wear is time-consuming. Specifically, one end of the pipe is sealed with a plug and the other end of the pipe has an air pump and air guage sealed thereto. The air pump is then operated so that the pipe is pumped with air to a certain minimum air pressure. Then, the air pressure within the pipe is checked, over a period of time, to determine whether the air pressure has decreased, i.e. whether air is leaking from the pipe. If the air pressure does decrease, the pipe may be worn to a point beyond its useful life. The air pressure decrease also may indicate that the pipe was not properly sealed at its ends or that the air gauge being used to measure the pressure is faulty. Therefore, if air pressure decreases, the air pressure test process generally is repeated at least once. This process is costly both in terms of time and equipment. Decreasing the costs and time required to inspect conduits and wires therefore could lead to substantial savings.

Known systems for detecting wear include systems such as the one described in U.S. Pat. No. 4,735,083. The above-identified patent describes a conduit for carrying liquid, the conduit including inner and outer surfaces and a dye disposed between the surfaces. When liquid flowing through the conduit acquires the color of the dye, the conduit should be replaced. With the system described in U.S. Pat. No. 4,735,083, if the outer surface wears faster than the inner surface, the dye may be discharged into, for example, the earth without providing a system user any indication of wear. Also, if the system described above is utilized in a water supply conduit for drinking water, discoloration of the water may be extremely undesirable.

It is therefore an object of the present invention to provide a system for detecting wear of articles, the system providing a qualitative indication as to wear.

Another object of the present invention is to provide a system for detecting wear of articles which provides an indication as to wear of an outer and/or an inner surface of the article.

Still another object of the present invention is to provide a system for detecting wear of articles which allows relatively fast inspection and detection.

SUMMARY OF THE INVENTION

The present system for detection of wear comprises an optical fiber, an electromagnetic radiation source and an electromagnetic detector. The optical fiber generally includes a core portion, cladding and a protective layer. With regard to a conduit such as a plastic pipe, the optical fiber is wrapped, during manufacture of the pipe, helically around and between the inner and outer surfaces of the pipe and to a selected thickness. The optical fiber generally is wrapped along the entire length of the conduit and an input end and an output end of the optical fiber extend from respective ends of the conduit. The electromagnetic radiation source is positioned at the input end of the optical fiber, and the electromagnetic radiation detector is positioned at the output end of the fiber.

Importantly, the optical fiber may be located at any desired depth, i.e. thickness, between the inner and outer surfaces. Therefore, the system user can determine an exact point at which it is desired to know the amount of wear. Further, more than one optical fiber may be utilized in a same conduit.

In operation, and before any wear occurs along the inner and outer surfaces of the conduit, a first beam of electromagnetic radiation having a known intensity and output by the radiation source is injected into the optical fiber. At the output end of the optical fiber, and substantially simultaneous to injection of the first beam, the radiation detector detects the intensity of a second beam emitted from the output end. The input power or the intensity of the first beam injected into the optical fiber and the power or intensity of the second beam emitted from the output end of the optical fiber are then recorded and stored as initial values. Even in this initial condition, there will be a difference between the intensity of the first and second signals due to power losses caused by transmission through the optical fiber. Rather than actually performing these initial measurements, it is possible to simply calculate, using well-known techniques, transmission power losses along the length of the fiber for a selected intensity input beam.

The conduit then is disposed in an operational condition, and during the operational life of the conduit, wear occurs along both the inner and outer surfaces. In order to determine whether wear along the inner and/or outer surfaces of the conduit has exceeded a predetermined amount of allowable wear, a third beam of substantially the same intensity as the first beam is injected into the optical fiber. Substantially simultaneous to injection of the third beam, intensity of a fourth beam emitted from the output end of the optical fiber is determined.

If there is no difference between the intensity of the second and fourth output beams, then the pipe has not worn to a point where the optical fiber is exposed. If there is a difference between the intensity of the second and fourth output beams, then the optical fiber has been exposed and deterioration of the protective layer and cladding of the fiber has occurred. That is, with the cladding in a deteriorated condition, greater transmission losses occur along the length of the optical fiber than transmission losses which occur in the initial, undeteriorated condition. When these increased transmission losses occur, the system user will be alerted that the pipe has become worn and that the optical fiber is exposed. Therefore, the system user, in accordance with the predetermined position of the optical fiber, will known how worn the pipe has become. By disposing the optical fiber at a desired thickness between the inner and outer surfaces of the conduit, therefore, the system user will be alerted as to when it is necessary to replace the conduit.

The present wear detection system therefore provides a more qualitative indication as to wear of an article. That is, when power losses along the length of the optical fiber become increased, the amount of wear is known. The present system also provides an indication of wear for both the inner and outer surfaces of an article, and provides relatively fast inspection and detection of wear.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE DRAWINGS

Figure 1:
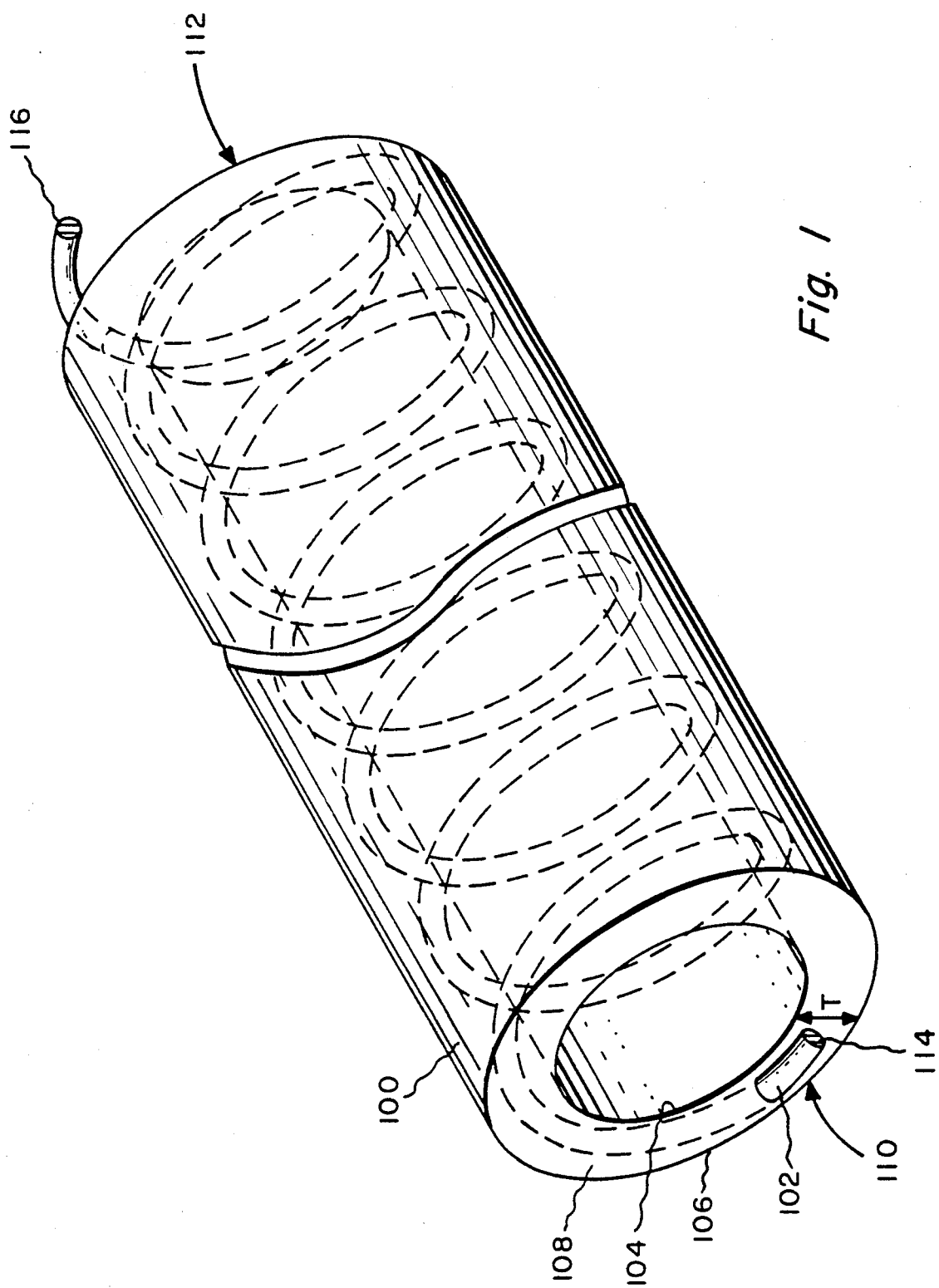
FIG. 1 is a perspective view of a conduit including an embodiment of the present system for detecting wear.

FIG. 1 illustrates a conduit 100 including an optical fiber 102 in accordance with the present invention. The conduit includes an inner surface 104 and an outer surface 106. The inner surface 104 defines a flow path through which fluid, gas, and the like may be transmitted. The inner surface and outer surface define a thickness T of wall 108. Conduit 100 also includes a first end 110 and a second end 112. Optical fiber 102 is placed within wall 108, and a predetermined distance between inner surface 104 and outer surface 106. As shown in FIG. 1, the optical fiber is wrapped helically along the entire length of the conduit and includes an input end 114 and an output end 116. It is not necessary that the fiber extend along the entire length, rather the fiber need only extend along the length of the conduit where it is desired to detect wear.

The optical fiber generally is disposed within the conduit during manufacture of the conduit. For example, if conduit 100 is a plastic pipe, the optical fiber is wrapped helically around the conduit and disposed between the inner and outer surfaces. Specifically, immediately after the molding process and while the plastic is still soft, the optical fiber can be wrapped helically around the conduit and between the inner and outer surfaces. The conduit could then be re-heated so as to form a complete enclosure around the optical fiber.

Figure 2:
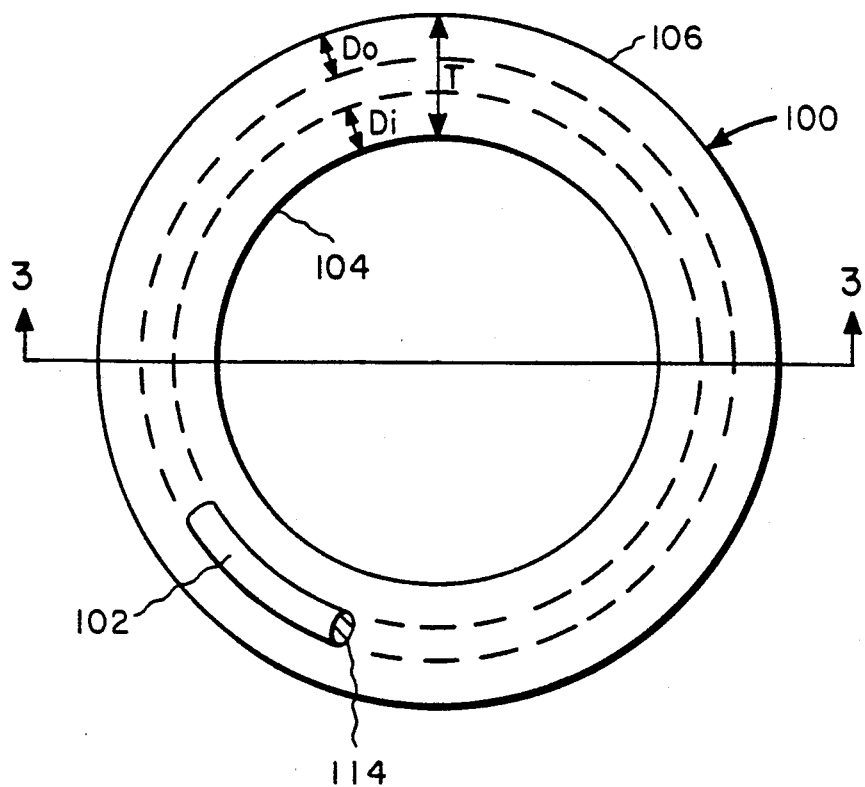
FIG. 2 is a top view of the conduit illustrated in FIG. 1.
Figure 3:
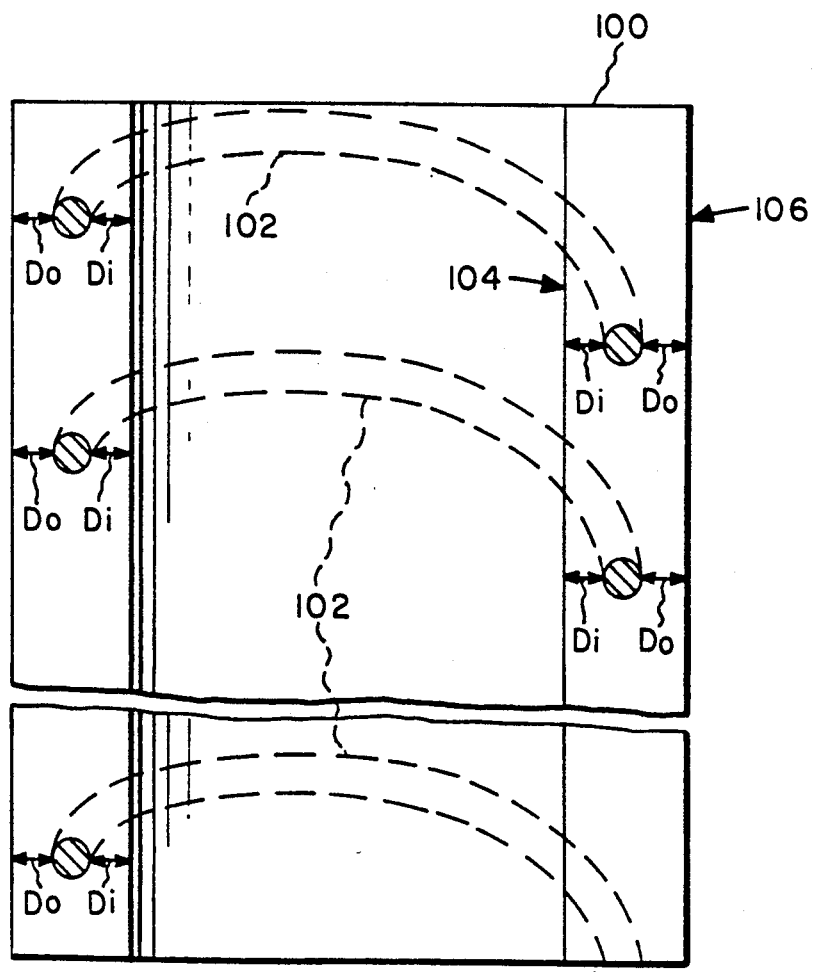
FIG. 3 is a sectional view through line 3—3 of the system illustrated in FIG. 2.

FIG. 2 illustrates a top view of conduit 100 including optical fiber 102. As illustrated in FIG. 2, optical fiber 102 is located at a distance $D_o$ from outer surface 106 and a distance $D_i$ from inner surface 104. The optical fiber, as shown in FIG. 2, is the same distance from the inner and outer surfaces along the entire length of the conduit. This may be best shown in FIG. 3 which is a cross-sectional view of conduit 100 through line 3—3 of FIG. 2. As shown in FIG. 3, the optical fiber is a same distance $D_i$ from inner surface 104 and the same distance $D_o$ from outer surface 106 along the entire length of the conduit.

Figure 4:
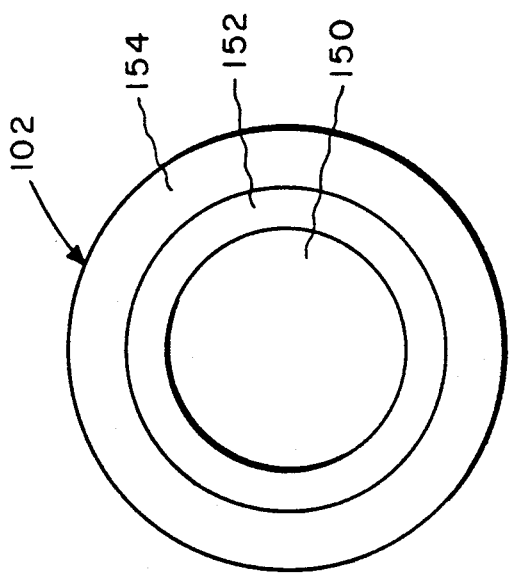
FIG. 4 is an end view of an optical fiber.

FIG. 4 illustrates an end view of optical fiber 102. Fiber 102 includes a core portion 150 through which an optical signal generally is transmitted. Optical fiber 102 also includes cladding portion 152 and an outer coating 154, sometimes referred to herein as a protective layer. Coating 154 generally is a protective coating utilized to prevent damage to cladding 152 and core 150. Cladding portion 152 is utilized to reflect an optical signal being transmitted through core portion 150. Specifically, as the optical signal is transmitted through core portion 150, the optical signal reflects off cladding 152.

Figure 5:
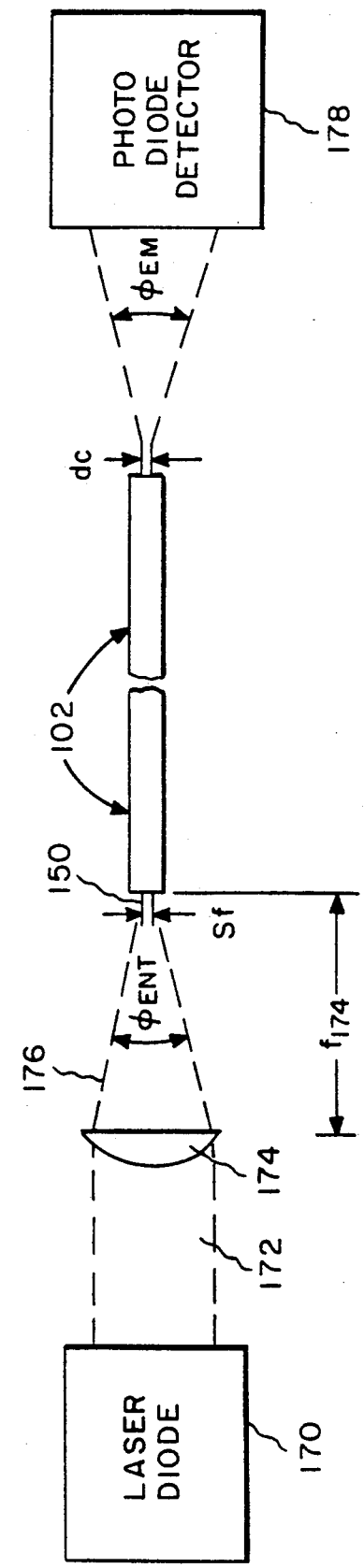
FIG. 5 illustrates injection and emission of electromagnetic radiation with respect to an optical fiber.

FIG. 5 illustrates injection and emission of electromagnetic radiation with respect to optical fiber 102. More specifically, an electromagnetic radiation source 170 is shown as being a laser diode. Source 170, however, could be any suitable commercially available light emitting source. A beam 172 emitted by laser diode 170 is intercepted by focusing lens 174. Focusing lens 174 focuses a beam 176 onto core portion 150 of optical fiber 102. Focused beam 176 is characterized by an entry cone angle $\phi_{ENT}$. The focal length of lens 174 is $f_{174}$. In accordance with the criteria for successful injection into an optical fiber, a focused spot diameter $S_f$ must be less than a diameter $d_f$ of core 150. At the output end of fiber 102, the transmitted beam is emitted with an emitted cone angle of $\phi_{EM}$. The emitted beam fully occupies diameter $d_f$ of the fiber core. An electromagnetic radiation detector 178, such as a photodiode, is positioned at the output end of the optical fiber and at a suitable distance so that substantially the entire emitted optical signal is received thereby. Detector 178 could be a commercially available laser diode, solar cell, or any device which translates an optical signal into an electrical signal.

Prior to inserting conduit 100 in an operational location, such as below the surface of the earth and as part of a water supply network, a first optical signal of known intensity output by source 170 is injected into input end 114 of optical fiber 102. The first optical signal is transmitted through the optical fiber along the length of the conduit 100 to output end 116. The intensity of a second optical signal emitted at output end 116 is detected by detector 178 at substantially the same time that the first beam is injected into the fiber. The intensity of the first and second signals are then recorded as initial values. Although the initial measurements generally are made prior to insertion of the conduit into the earth, such as at the factory, such measurements could be made after insertion into the ground. Further, rather than actually measuring the initial values, power losses along the length of fiber for a selected intensity input beam could be calculated using well-known formulas.

During the life of the conduit, and in order to determine whether an unacceptable amount of wear has occurred, measurements are made by injecting a third optical signal having substantially the same intensity as the first optical signal, and the intensity of a fourth optical signal emitted at the output end is measured substantially simultaneous to injection of the third beam. The intensity of the fourth signal at the output end then is compared with the intensity of the second signal. Any difference, i.e. a decrease, in the intensity between the fourth optical signal from the second signal indicates wear along the length of the conduit.

Specifically, if the conduit becomes sufficiently worn either at its outer surface or inner surface so that the optical fiber is exposed, wear of coating 154 of the optical fiber will occur. Eventually, once even a small portion of coating 154 has worn through, cladding 152 will begin to deteriorate. This wear and subsequent deterioration of the cladding causes the transmission efficiency of the optical fiber to decrease. More specifically, as the beam of electromagnetic radiation passes along the length of the optical fiber, it is reflected at the outer edges of the core, by the cladding, through the core. Deterioration of the cladding, however, decreases the reflective characteristics of the cladding and some electromagnetic radiation may even escape. Deterioration of the cladding will therefore cause increase power losses to occur along the length of the optical fiber. These increased power losses can be detected at the output end of the optical fiber due to a corresponding decrease in intensity of the output signal. Eventually, if the optical fiber has become exposed and if the conduit is not replaced, the optical fiber will be worn completely through and will break. At this point, no signal will be received at the output end of the optical fiber thereby providing further indication as to the wear of the conduit.

The position at which the optical fiber is disposed within the conduit generally is predetermined and selected in accordance with a specific application. For example, if the conduit is being utilized in an environment wherein wear along the outer surface of the conduit is important to be known, distance $D_o$ could be decreased and distance $D_i$ increased thereby placing the optical fiber closer to the outer surface. Likewise, if the conduit is being utilized in an environment wherein wear of the inner surface of the conduit is desired to be known, distance $D_i$ could be decreased and distance $D_o$ increased. Further, rather than using a single fiber, multiple fibers could be utilized. Each fiber would be placed at a different thickness along the length of the conduit. Therefore, each optical fiber could be utilized to provide an even more quantitative indication as to wear.

The present invention not only provides a quantitative indication as to wear of an article, but also provides an indication as to wear of either or both outer and inner surfaces of the article. That is, the optical fiber can become exposed due to wear of the inner and/or outer surfaces. The present invention also allows relatively fast inspection and detection of wear of articles.

Figure 6:
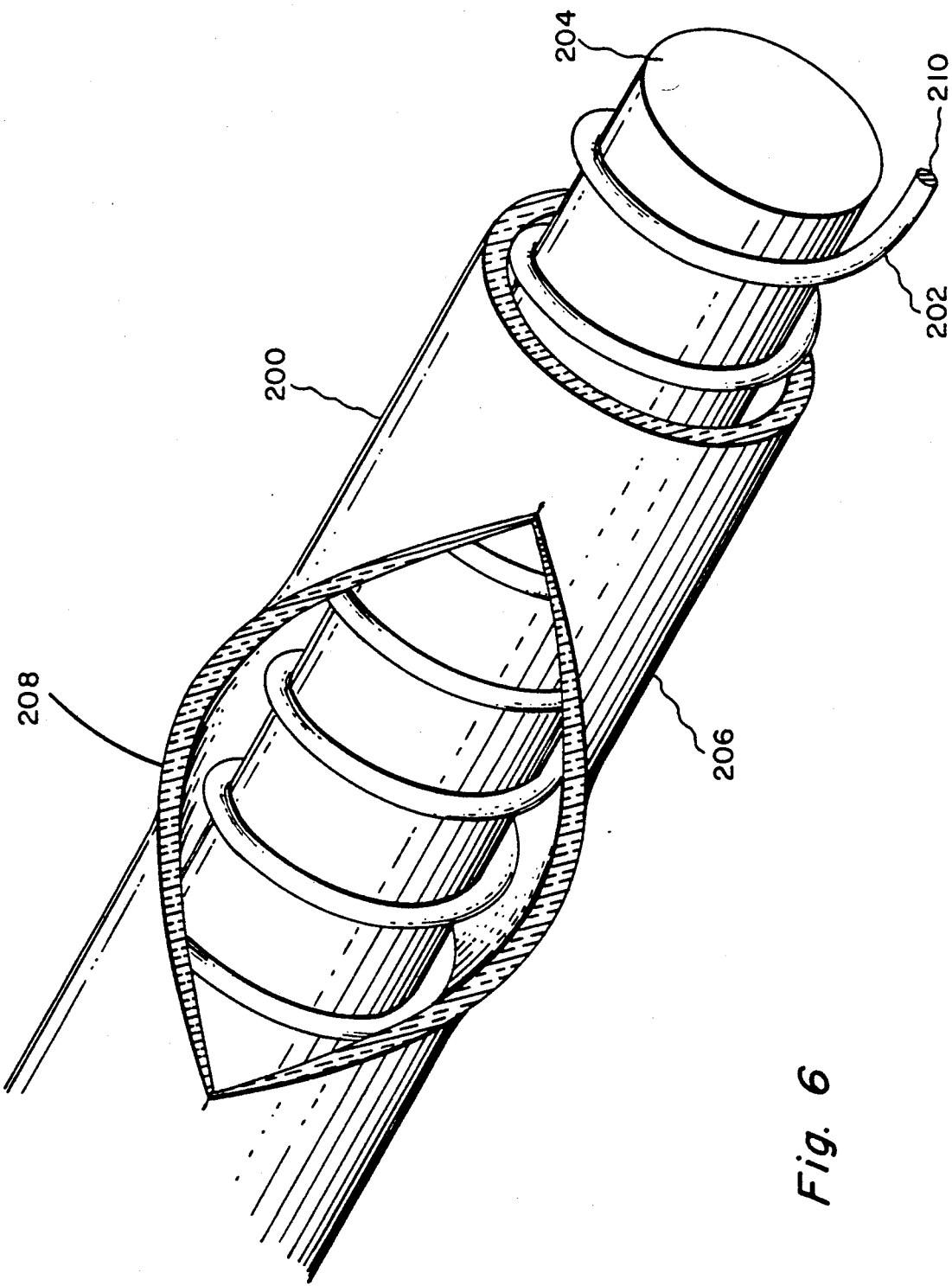
FIG. 6 is a perspective view of an insulated wire including another embodiment of the present wear detection system.

FIG. 6 illustrates an insulated wire 200 including an optical fiber 202 in accordance with another embodiment of the present invention. The insulated wire includes an inner conduction portion 204 and an insulating portion 206. A section 208 of the insulating portion 206 is cut away in order to enable better illustration of the present invention. Specifically, as with the conduit illustrated in FIG. 1, optical fiber 202 includes an input end 204 and an output end (not shown). The optical fiber is wrapped helically around conduction portion 204 along the entire length of the conductor. As with conduit 100, it is not necessary that the fiber extend along the entire length of the conductor. Rather, the fiber need only extend along the length of the conductor where it is desired to detect wear. Insulator 206 is then formed over conductor 204 and optical fiber 202.

Although optical fiber 202 is shown in FIG. 6, for illustrative purposes, as being adjacent to conduction portion 204, optical fiber 202 could be placed a predetermined distance within the thickness of insulator 206. More specifically, during manufacture of the insulated wire, the optical fiber may be disposed within the insulation while the insulation is still soft. Also, if the insulation is layered, the optical fiber could be wrapped helically around one layer prior to disposing another layer on the assembly.

In operation, a first optical signal, such as the signal emitted by a laser diode, of a known intensity is injected into input end 202 of optical fiber 204 and the first signal is transmitted by the optical fiber along the length of a conductor. At the output end of the optical fiber, and substantially simultaneously to injection of the first signal, the intensity of a second signal is detected by an electromagnetic radiation detector. The initial intensity values of the first and second signals are then recorded. Rather than performing actual measurements for these initial values, the initial values could be calculated using well-known formulas.

During the lifetime of the conductor, and in order to determine wear of the conductor, a third signal having substantially the same intensity as the first signal is injected into the input end of the fiber. Substantially simultaneous to injection of the third signal, the intensity of a fourth signal output at the output end of the fiber is detected. The intensity of the second and fourth signals are compared and when a change, i.e. a decrease, occurs between intensity of the second and fourth output optical signals, wear of insulating portion 206 is then known.

Although the present invention has been described with respect to specific embodiments, many modifications, variations, substitutions, and equivalents will now be apparent to those skilled in the art. For example, rather than utilizing a laser diode, an infrared or ultraviolet radiation source could be utilized to inject an infrared or ultraviolet signal, respectively, into the optical fiber. Utilizing these alternative radiation sources would be most useful in light sensitive areas where it is desired to keep the work environment dark. Wear of the insulation or pipe so that the optical fiber is exposed would result in emission of infrared or ultraviolet light at the point of wear. This emitted light would be observable and/or detectable, and also enable precise location of the wear point.

The present wear detection system also may be utilized with many articles and is not limited to use with conduits and conductors. Further, the optical fiber does not necessarily have to be helically wrapped along the length of the article. The optical fiber could be disposed in many configurations at the location where wear detection is required. Accordingly, the invention is to be considered limited only by the spirit and scope of the appended claims.

What is claimed is:

1. An apparatus for detecting wear along the surfaces of an elongated article, said apparatus comprising:
    an optical fiber disposed at a predetermined depth and at a location within the article where wear is to be detected, said optical fiber being helically-shaped and including an input end and an output end, said input and output ends being disposed so as to be accessible by a system user;
    means for emitting electromagnetic radiation, said emitting means disposed so as to be able to inject radiation into said input end of said optical fiber; and
    means for detecting electromagnetic radiation, said detecting means disposed so as to be able to detect radiation emitted at said output end of said optical fiber.

2. An apparatus for detecting wear of an article in accordance with claim 1 further comprising a plurality of optical fibers disposed at locations within the article where wear is to be detected.

3. An apparatus for detecting wear in accordance with claim 1 wherein said emitting means comprises a laser diode and said detecting means comprises a photo-diode.

4. An apparatus for detecting wear in accordance with claim 1 wherein said emitting means comprises an infrared light source.

5. An apparatus for detecting wear in accordance with claim 1 wherein said emitting means comprises an ultraviolet light source.

6. An apparatus for detecting wear in accordance with claim 1 wherein the article is a conduit including inner and outer surfaces, said optical fiber being wrapped helically around and between said inner and outer surfaces.

7. An apparatus for detecting wear in accordance with claim 6 wherein said optical fiber is disposed a predetermined distance from said inner and outer surfaces of said conduit in accordance with user-selected specifications.

8. An apparatus for detecting wear in accordance with claim 6 wherein said conduit is a plastic pipe.

9. An apparatus for detecting wear in accordance with claim 6 wherein said conduit is a steel pipe.

10. An apparatus for detecting wear in accordance with claim 1 wherein the article is an insulated wire, the insulation of said wire including inner and outer surfaces.

11. An apparatus for detecting wear in accordance with claim 10 wherein said optical fiber is disposed between and a predetermined distance from said inner and outer surfaces of said insulation in accordance with user-selected specifications.

12. An apparatus for detecting wear of a fluid-carrying conduit having inner and outer surfaces, said apparatus comprising:
    an optical fiber disposed between said inner and outer surfaces and at a predetermined depth, said optical fiber being helically-shaped and including an input end and an output end disposed so as to be accessible by a system user;
    means for emitting electromagnetic radiation disposed so as to be able to inject radiation into said input end of said optical fiber; and
    means for detecting electromagnetic radiation disposed so as to detect radiation emitted at said output end of said optical fiber.

13. An apparatus for detecting wear in accordance with claim 12 wherein said optical fiber is wrapped helically around and between said inner and outer surfaces.

14. An apparatus for detecting wear in accordance with claim 12 further comprising a plurality of optical fibers wrapped helically around and between said inner and outer surfaces.

15. An apparatus for detecting wear in accordance with claim 12 wherein said optical fiber is wrapped helically around said inner and outer surfaces along the entire length of the conduit.

16. An apparatus for detecting wear in accordance with claim 12 wherein said optical fiber is disposed a predetermined distance from said inner and outer surfaces and in accordance with user-selected specifications.

17. An apparatus for detecting wear in accordance with claim 12 wherein said conduit is to be disposed beneath the surface of the earth.

* * * * *